United States Patent [19]
Redmond

[11] Patent Number: 5,873,173
[45] Date of Patent: Feb. 23, 1999

[54] DEVICE FOR MEASURING LENGTH AND VERTICAL CLEARANCE OF ENGINE CONNECTING RODS

[76] Inventor: David W. Redmond, 135 Lakeland Cir., Fayetteville, Ga. 30215

[21] Appl. No.: 903,897

[22] Filed: Jul. 31, 1997

[51] Int. Cl.$^6$ ........................................... G01B 5/02
[52] U.S. Cl. ........................ 33/603; 33/555; 33/712
[58] Field of Search ........................... 33/603, 710, 712, 33/600, 604, 545, 549, 555

[56] References Cited

U.S. PATENT DOCUMENTS

| | | | |
|---|---|---|---|
| 1,436,104 | 11/1922 | Husak | 33/603 |
| 1,569,119 | 1/1926 | Feider | 33/603 |
| 1,575,797 | 3/1926 | Shaw | 33/603 |
| 2,025,008 | 12/1935 | Arp | 33/603 |
| 2,336,860 | 12/1943 | Graham | 33/603 |
| 2,664,643 | 6/1954 | Billeter | 33/603 |
| 2,933,815 | 4/1960 | Czaplinski et al. | 33/545 |
| 5,375,341 | 12/1994 | College et al. | 33/545 |

*Primary Examiner*—Christopher W. Fulton
*Attorney, Agent, or Firm*—Marvin L. Moore

[57] ABSTRACT

A device for measuring length and vertical clearance of engine connecting rods comprising a base which is attached to an upstanding member in a hinged fashion. A vertical guide slot of substantial length is disposed within the upstanding member along a longitudinal center axis and distal to the base. A wrist pin mandrel comprising a guide slot receiving member is disposed on the upstanding member such that said guide slot receiving member is engaged in the vertical guide slot. Positioned at the top of the upstanding member is a dial indicator within a mount. A plunger projecting downward from said dial indicator rests upon the top of the mandrel's guide slot receiving member. Proximally to the base of the measuring surface is a standard mount which engages a standard. The standard is vertically slidable and adapted to be locked at adjusted elevations within said mount. A pair of self-centering pins extend perpendicularly from the measuring surface which are offset one to each side of the standard equal distance and on a horizontal line above the mount. A lever is pivotally attached beside a lower stop of the guide slot for urging the mandrel upward within the guide slot.

14 Claims, 4 Drawing Sheets

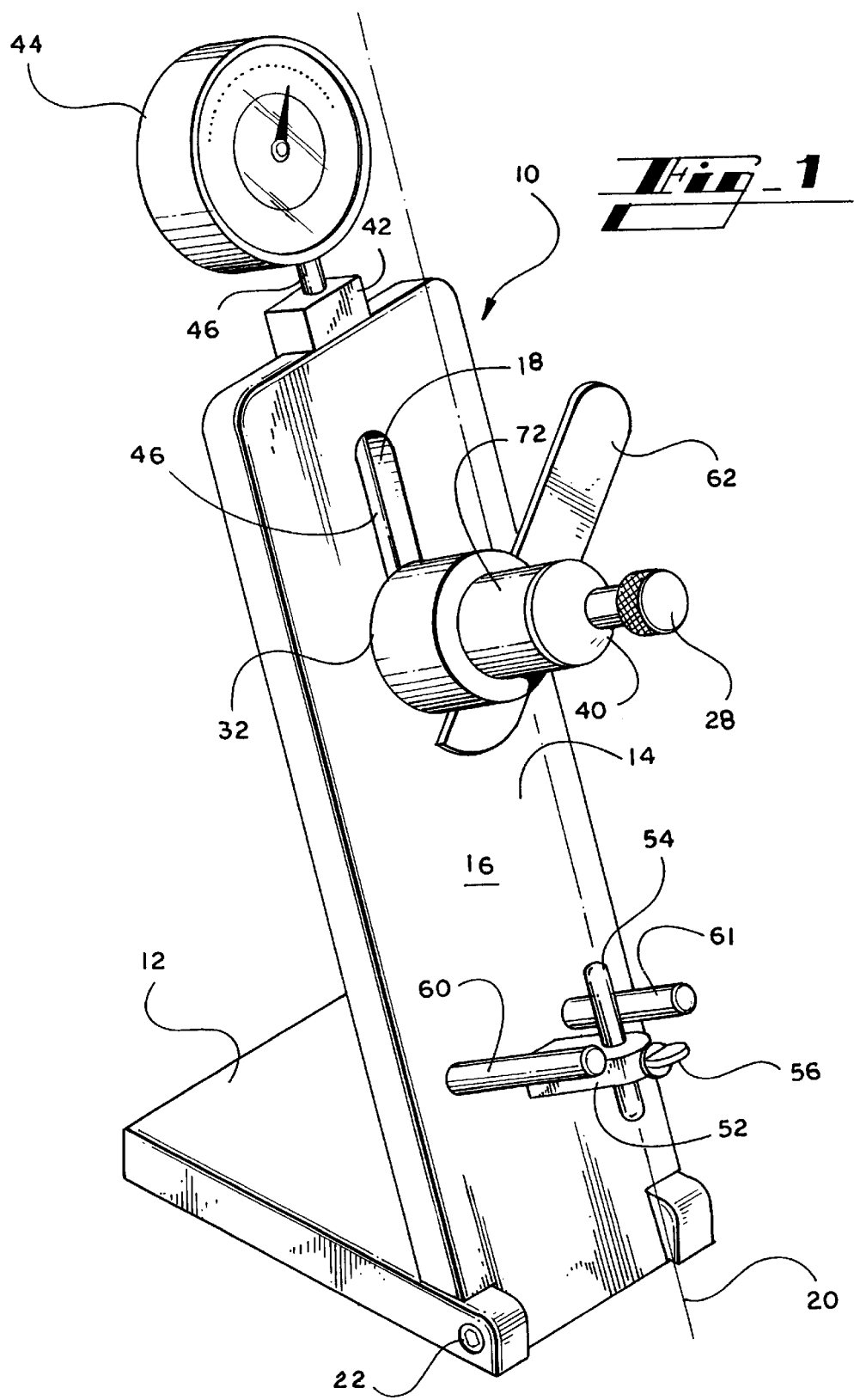

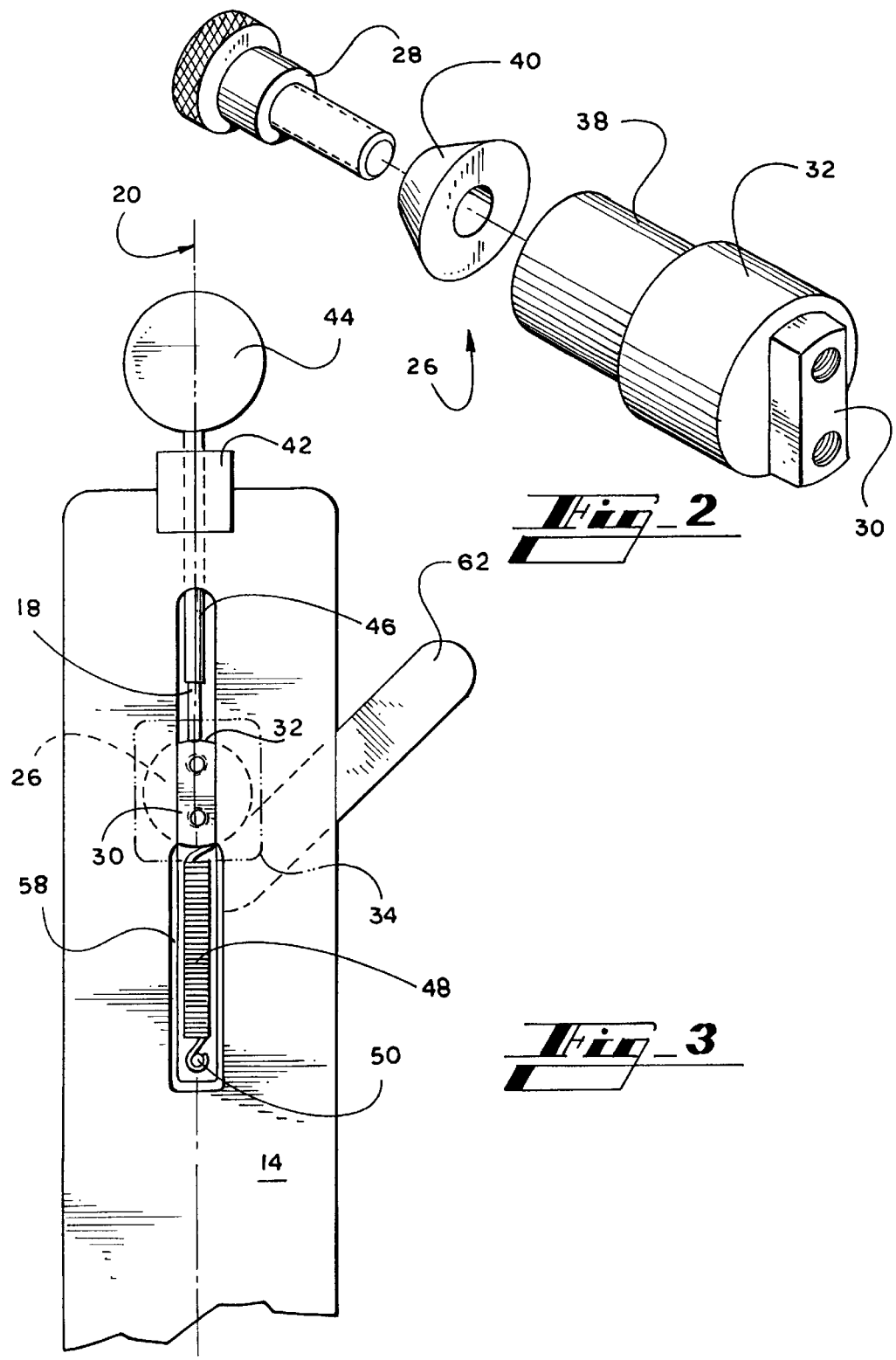

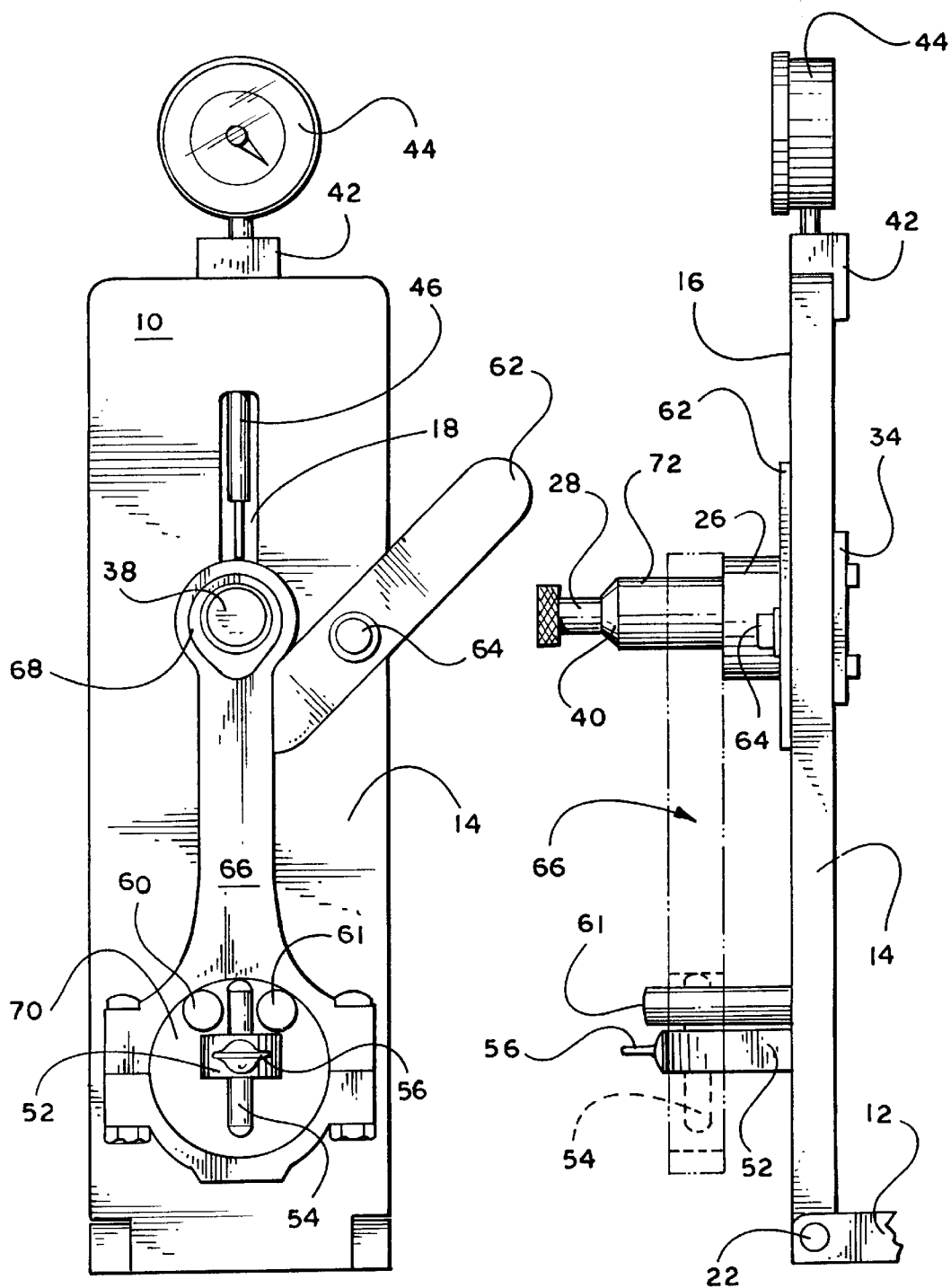

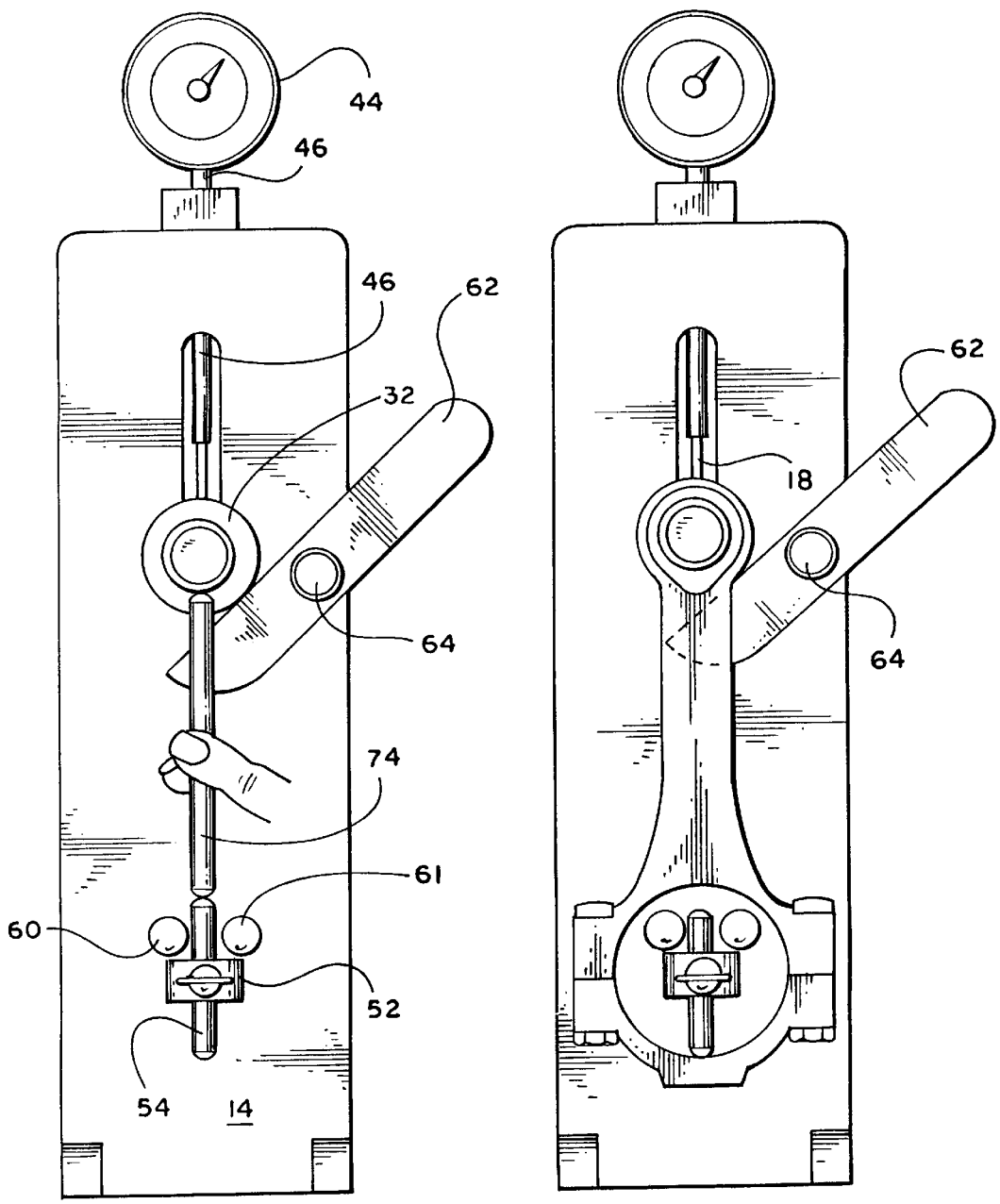

DEVICE FOR MEASURING LENGTH AND VERTICAL CLEARANCE OF ENGINE CONNECTING RODS

FIELD OF THE INVENTION

The present invention relates generally to a device for measuring connecting rods and more specifically a device for measuring length and vertical clearance of engine connecting rods.

BACKGROUND OF THE INVENTION

When piston bearing engines seize due to failure in the drive line or other engine components, damage to the connecting rods is common. Rods may bend, twist, draw, or become elongated. Regardless, any damage to the connecting rods render an engine less efficient and in some cases inoperable. Therefore, mechanics need a precise means for determining whether distortion exist and if so to what extent before attempting to restore an engine to its original condition.

Various patents have been granted on devices which are designed to detect and measure defects in connecting rods. Representative of the prior art devices include the following.

U.S. Pat. No. 1,436,104 to Husak discloses an engine connection rod test gauge which relates to the fittings of crank connecting rods for automobile engines. This device tests the parallelism of the piston-pins with the crank bearings and any deviation from accuracy can be corrected.

U.S. Pat. No. 1,575,797 to Shaw discloses a lining jig intended for use in testing the condition of engine connecting rods and determining whether they are straight.

U.S. Pat. No. 2,025,008 to Arp discloses a connecting rod and piston testing and alignment device adapted for use to check the accuracy and parallelism of connecting rod bearings and their perpendicularly to pistons.

While these devices would appear to operate reasonably well and generally achieve their objectives under the limited range of operating conditions for which they were designed these devices embody one or more of the following drawbacks.

Neither prior art device allows the operator to measure an individual rod's standard length to the thousandths of an inch or metric length to the millimeter. Furthermore, the prior art fails to allow the operator to measure an individual rod's vertical clearance. Additionally, there remains a need for an improved device which allows the operator to obtain with precision length and vertical clearance of a series of engine connecting rods of a variety of sizes and from these critical readings detect any deviation from the manufacturers specification.

SUMMARY OF THE INVENTION

It is therefore an object of the present invention to provide a single device which allows the operator to detect misalignment in an engine connecting rod due to bend or twist.

It is another object of the present invention to provide a device which allows the operator to measure with precision the vertical clearance of an engine connecting rod.

It is another object of the present invention to provide a device which allows the operator to measure the length center-to-center of a singular connecting rod.

It is another object of the present invention to provide a device which allows the operator to rapidly measure the lengths of a series of connecting rods against an established standard rod.

It is a further object of this invention is to provide a device which allows the operator to measure connecting rods in metric or standard readings.

An even further object of the present invention is to provide a device for measuring engine connecting rods of varying lengths by readily adjustable means without the necessity of employing adapters.

The present invention provides a device for measuring length and vertical clearance of engine connecting rods. The device comprises a base which is attached to an upstanding member in a hinged fashion. The upstanding member is fixed in a substantially upright position above the base when the device is in operation. A measuring surface is provided on the upper side of the upstanding member for receiving a connecting rod. A vertical guide slot of substantial length is disposed within the upstanding member along a longitudinal center axis and distal to the base.

A wrist pin mandrel comprising a guide slot receiving member, flange, shaft, and a guide plate is disposed on the upstanding member. The guide slot receiving member is slidably engaged in the guide slot and held against the lower stop by a spring. The flange rests upon the measuring surface of the upstanding member while the shaft is designed to receive a piston pin attachment means. The guide plate holds the mandrel in position while allowing it to slide within the guide slot.

Positioned at the top of the upstanding member is a dial indicator within a mount. A plunger projecting downward from the dial indicator rests upon the top of the mandrel's guide slot receiving member.

Proximally to the base of the measuring surface is a standard mount which engages a standard. The standard is vertically slidable and adapted to be locked at adjusted elevations within said mount with a winged locking screw. A pair of self-centering pins extend perpendicularly from the measuring surface which are offset one to each side of the standard equal distance and on a horizontal line above the mount.

Disposed beside the lower stop of the guide slot is a lever attachment means. A lever is pivotally attached by said means which is designed for urging the mandrel upward within the guide slot against the spring tension thereby causing the plunger to register a reading on the dial indicator.

Other aspects, objects, features and advantages of the present invention will become apparent to those skilled in the art upon reading the detailed description of preferred embodiments in conjunction with the accompanying and appended claims.

DESCRIPTION OF THE INVENTION

In the drawings, which are discussed below, the same reference numerals refer to the same features of the invention throughout the drawings. A portable device for measuring length and vertical clearance according to a preferred embodiment of the invention is shown in FIGS. 1–7.

FIG. 1 represents a perspective view of the device for measuring length and vertical clearance of engine connecting rods.

FIG. 2 represents a perspective view of the mandrel.

FIG. 3 represents a rear view of the device.

FIG. 4 represents a front view of the device and a connecting rod engaged on the measuring surface.

FIG. 5 represents a side view of the device and a connecting rod illustrated in dotted lines in opertive relation to the measuring surface.

FIG. 6 represents a front view of the device and a tested rod after the mandrel has been lifted in the guide slot.

FIG. 7 represents a front view of the device with a standard held in position as when measuring the length of an engine connecting rod.

DETAILED DESCRIPTION

While the specification concludes with claims particularly pointing out and distinctly claiming the subject matter which is regarded as the invention, the invention will now be described by reference to the following description of preferred embodiments taken in conjunction with the accompanying drawings.

Referring now to the drawings and particularly to FIG. 1, there is shown a perspective view of a portable device for measuring length and vertical clearance of engine rods generally designated by the numeral 10 and constituting one embodiment of the invention. The present device has as its components a base 12 hinged at one end to an upstanding member 14. The upstanding member 14 receives a wrist pin mandrel 26 which is held in position by a spring member 48. A dial indicator 44 seated in a dial mount 42 is positioned at the top of the upstanding member 14. Projecting downward from the dial indicator 44 is a plunger 46 which engages the mandrel guide slot receiving member 30. A standard mount 52 which receives a standard 54 is disposed near the base end of the upstanding member 14. Self centering pins 60 and 61 respectively are off-set equal distance to each side of the mounted standard 54. With the preceding is a lever 62 which acts to operate the device.

The base 12, on which the device stands, has a generally square configuration and of sufficient weight to provide stability to the device when a connecting rod is being measured. In the present embodiment the base 12 is provided with L-shaped notches at two adjacent corners as an attachment means to apertured ears at one end of the upstanding member 14. The upstanding member 14 has a rectangular configuration and substantial height and width to receive a connecting rod on a measuring surface 16. The upstanding member 14 is provided with an elongated vertical guide slot 18 disposed distal to the base 12 along a longitudinal center axis 20. When the device 10 is in operation the upstanding member 14 is locked in a substantially upright position above the base 12 by set screws 22. The set screws 22 traverse holes centered in the apertured ears of the upstanding member 14 and into threaded bores suitably positioned at the notched corners of the base 12.

Referring now to FIG. 2 there is shown a wrist pin mandrel 26 having a flange 32 a shaft 38 and a guide slot receiving member 30. The mandrel 26 is designed such that when mounted the flange 32 rests upon the measuring surface 16 of the upstanding member 14 while the guide slot receiving member 30 is engaged in the vertical guide slot 18. Projecting from the front side of the flange 32 is a threaded shaft 38 which receives a piston pin attachment means 28. The piston pin attachment means 28 is preferably a bolt of suitable length inserted in a self centering cone head bushing 40. The piston pin attachment means 28 must be of sufficient length so as to secure the piston pin of the measured rod firmly in place against the mandrel 26. Attached to the rear of the guide slot receiving member 30 is a mandrel guide plate 34, as shown in FIG. 3. The guide plate 34 acts to secure the mandrel 26 in the slot 18 while also allowing it to move freely Now referring to FIG. 3 there is shown a rear view of the device 10. A dial mount 42 is aligned above the vertical guide slot 18 and upon the top of the upstanding member 14. The dial mount 42 receives a dial indicator 44 which is viewed, by the operator, from the measuring surface 16 of the device 10. A suitable dial indicator 44 must be capable of giving standard readings in thousandths of an inch or metric readings in millimeters. A plunger 46 projects downward from the dial indicator 44 through the mount 42 into a bore within the upstanding member 14. Ultimately the plunger 46 engages the top of the guide slot receiving member 30. Aligned beneath the guide slot 18 and encased within a vertical cavity within the upstanding member 14 is spring member 48. The upper end of the spring member 48 is attached to the mandrel guide slot receiving member 30. The lower end of the spring member 48 is attached to a spring securing means 50. The spring is preferably an extension coil spring. It will, of course, be understood that the force exerted by the spring 48 is in a direction to draw the mandrel 26 against the lower stop of the guide slot 18 when the device 10 is in a resting state.

The standard mount 52 is located on the measuring surface 16 beneath the spring cavity 58 and within said axis 20. Engaged within the mount 52 is a standard 54 which is vertically slidable and adapted to be locked at adjustable elevations within the mount 52 by means of a winged locking screw 56. Standards are solid steel rods which are precisely machined to specific lengths. As should become apparent to the operator standards used to measure vertical clearance must have a length less than the diameter of the rod's bearing eye. However, when measuring the length of connecting rods, standards of any reasonable length may be adapted to the present device. As will be better understood later, if the standard is too long the dial will register a plus reading but if the standard is too short the dial will register a negative reading.

A pair of self-centering pins 60 and 61 respectively extent perpendicularly from the measuring surface 16 and are offset equal distance one to each side of the standard 54 on a horizontal line and above the standard mount 52. Centering pins 60 and 61 function to center an engaged rod 66 such that a line drawn upward through the standard 54 to the plunger 46 bisects the length of a measured rod.

Disposed beside the lower stop of the guide slot 18 is a lever attachment means 64. A lever 62 is pivotally attached by said means 64 which is designed for urging the mandrel 26 upward within the guide slot 18 against the tension caused by the spring 48 thereby causing the plunger 46 to register a reading on the dial indicator 44.

It should be understood that all component parts comprising the present device, with the exclusion of the dial indicator 44, are made of a material of sufficient strength to withstand any impact encountered during normal operation.

In the use of the present device the connecting rod 66 must first be properly engaged as shown by FIGS. 4 and 5. The piston pin or equivalent gauge 72 having a bore substantially equal to the diameter of the mandrel shaft 38 is slidably mounted upon said shaft 38. A piston pin attachment means 28 which receives a cone head bushing 40 is then screwed into the mandrel shaft 38 to secure the piston pin or gauge 72 to the mandrel 26, as in FIG. 5. The cone head bushing 40 is designed to also function as a means for centering a pin or gauge 72, having a bore substantially greater than the shaft diameter, upon said shaft 38. The wrist pin eye 68 of the measured connecting rod 66 is slidably fitted upon the piston pin 72 and pressed firmly against the flange 32. The piston pin or gauge must have diameters which are substantially equal to the bore of the wrist pin eye 68 thereby creating a rigid union between the wrist pin eye 68, the pin or gauge 72, and the shaft 38. The bearing eye 70 of the suspended rod rests upon the self-centering pins 60 and 61.

A connecting rods vertical clearance is equivalent to the diameter of the bearing eye 70 minus the diameter of the crank shaft pin. This measurement is taken by first engaging the measured rod 66 as described previously. The standard 54 is moved upward until it touches the upper most crown of the bearing eye 70 as in FIG. 4. With the dial indicator 44 set to zero the lever 62 is pivoted so as to cause the mandrel 26 and measured rod 66 to move upward until the standard 54 touches the lower most crown of bearing eye 70 as in FIG. 6. The reading from the dial indicator 44 added to the length of the standard 54 yields the vertical clearance of the rod.

To check the length of a connecting rod the vertical clearance and wrist pin diameters must be known. The vertical clearance should be calculated in the manner already fully described. Relying on the vertical clearance specified by the manufacture could prove to be inaccurate if the connecting rod has been distorted. The diameter of the piston pin 72 as specified by the manufacture is used for the calculation of the diameter of wrist pin eye 68 since these figures are substantially equal. In practice lengths of rods are measured from the center of the wrist pin eye 68 to the center of the bearing eye 70 or in other words from center-to-center. The rod to be measured 66 is engaged as shown in FIG. 4 with the standard 54 upward. The rod 66 is then removed from the device 10. A standard 74 of known length is held from the top of the mounted standard 54 to the lower most crown of the piston pin or gauge 72 as shown in FIG. 7. Preferably the standard should have a length which most approximates the actual length of the rod 66. The dial indicator 44 is set to zero and the held standard 74 is then removed. To calculate the length of a measured rod 66 add the diameters previously calculated and divide this sum by two which gives the combined radius of the piston pin 72 and bearing eye 70. To this figure is added the known length of the held standard 74. The result is an established base length against which a measured rod 66 can be compared. With the dial 44 previously set to zero engage the newly measured rod 66 and lift it, as in FIG. 6. If the dial 44 rotates in a negative direction subtract the dial reading from the established base length to get the length of the measured rod. If the dial rotates in a positive direction add the dial reading to the established base length to get the length of the measured rod. This result is then compared to the manufactures specification to determine if any distortion is present. The magnitude of any difference in the measurements directly indicates the magnitude of distortion.

To measure the length of a series of rods select a base rod to obtain a base length. This is achieved by engaging the rod and lifting it in the guide slot 18, as shown in FIGS. 5 and 6. While lifted set the dial indicator 44 to zero then remove the rod. Each subsequent rod now engaged on the device as calibrated having the same length as the selected base rod will register a zero reading when measured.

It is pointed out that any force that impacts the rod in a negative way will ultimately alter that rods vertical clearance or length center-to-center. Accordingly, the present device can detect bend in a rod when the measured length proves shorter than specified by the manufacturer. The present device can also detect twist in a rod because a twisted rod won't properly engage the measuring surface.

From the preceding, it should be evident that the invention has satisfied a need in providing an improved means for measuring connecting rods. The device affords a precise means for measuring both length and vertical clearance while also being able to detect bend and twist.

As should be apparent from the foregoing specification, the invention is susceptible to being modified with various alterations which may differ from those which have been described in the proceeding specification and description. Accordingly, the following claims are intended to cover all alterations and modifications which do not depart from the spirit of the invention.

What is claimed:

1. A device for measuring length and vertical clearance of engine connecting rods comprising:

a base hinged at one end to an upstanding member having a measuring surface whereby said member is provided with a vertical guide slot located opposite the hinged end and disposed along a longitudinal center axis;

a wrist pin mandrel having a guide slot receiving member, a threaded shaft, a flange, and a guide plate and is mounted such that the guide slot receiving member is engaged in said guide slot;

a dial mount aligned above the guide slot and centered upon the top of said surface which receives a dial indicator;

a plunger projecting downward from said indicator to rest upon the guide slot receiving member of said mandrel;

a spring member aligned beneath the guide slot and having an upper end attached to the mandrel and a lower end attached to a securing means;

a standard mount extending from said measuring surface which engages a standard aligned on said axis beneath the spring cavity;

a pair of self-centering pins extending from said measuring surface and offset equal distance to each side of the standard above the mount; and a lever pivotally attached to said surface for moving the mandrel within the guide slot.

2. The device for measuring length and vertical clearance of engine connecting rods of claim 1, whereby said upstanding member is fixed in a substantially upright position above the base.

3. The device for measuring length and vertical clearance of engine connecting rods of claim 1, whereby said upstanding member has substantial height and width to receive a connecting rod.

4. The device for measuring length and vertical clearance of engine connecting rods of claim 1, whereby said wrist pin mandrel flange rests upon the measuring surface when the mandrel is engaged in the vertical guide slot.

5. The device for measuring length and vertical clearance of engine connecting rods of claim 1, whereby said guide plate is attached to the rear of the guide slot receiving member.

6. The device for measuring length and vertical clearance of engine connecting rods of claim 1, whereby said guide plate secures the mandrel in the guide slot while allowing the mandrel to move freely.

7. The device for measuring length and vertical clearance of engine connecting rods of claim 1, whereby said mandrel threaded shaft receives a piston pin attachment means which has been inserted in a self centering cone head bushing.

8. The device for measuring length and vertical clearance of engine connecting rods of claim 1, whereby said plunger projects downward along said axis through the mount into a bore in the upstanding member through the guide slot to rests upon the guide slot receiving member of said mandrel.

9. The device for measuring length and vertical clearance of engine connecting rods of claim 1, whereby said spring member is an extension coil spring.

10. The device for measuring length and vertical clearance of engine connecting rods of claim 1, whereby said spring member is encased in a vertical cavity within the upstanding member.

11. The device for measuring length and vertical clearance of engine connecting rods of claim 1, whereby said spring member urges the mandrel against a lower stop of the guide slot.

12. The device for measuring length and vertical clearance of engine connecting rods of claim 1, whereby said standard is vertically slidable and adapted to be locked at adjustable elevations within said mount with a winged locking screw.

13. The device for measuring length and vertical clearance of engine connecting rods of claim 1, whereby said lever is pivotally attached to the measuring surface beside a lower stop of the guide slot.

14. The device for measuring length and vertical clearance of engine connecting rods of claim 1, whereby said lever moves the mandrel upward against the spring tension causing the plunger to register a reading on the dial.

* * * * *